Patented Feb. 7, 1928.

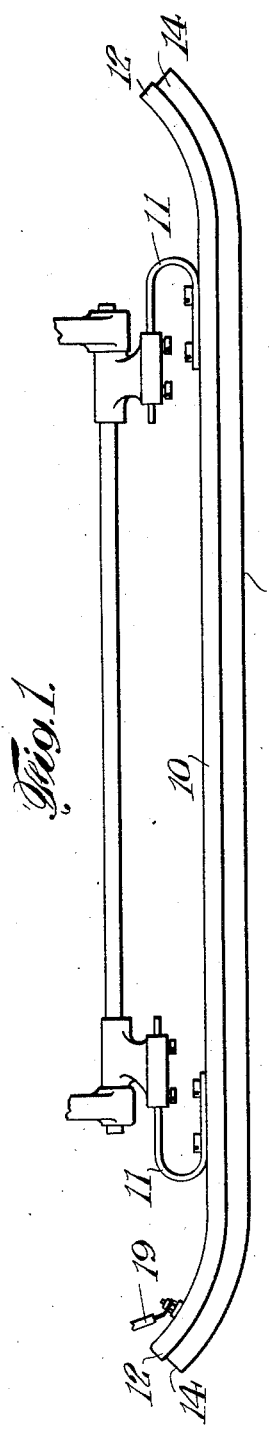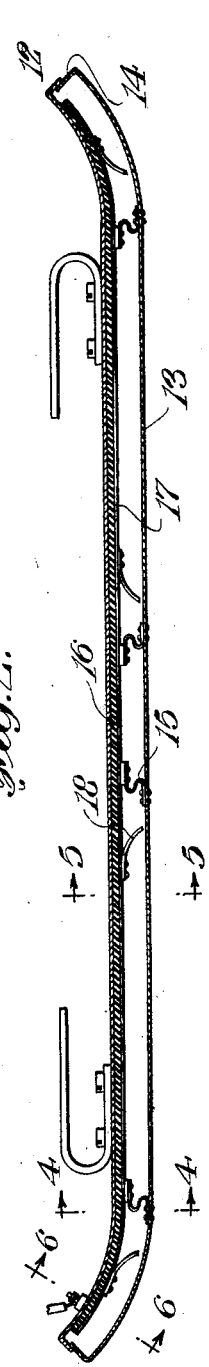

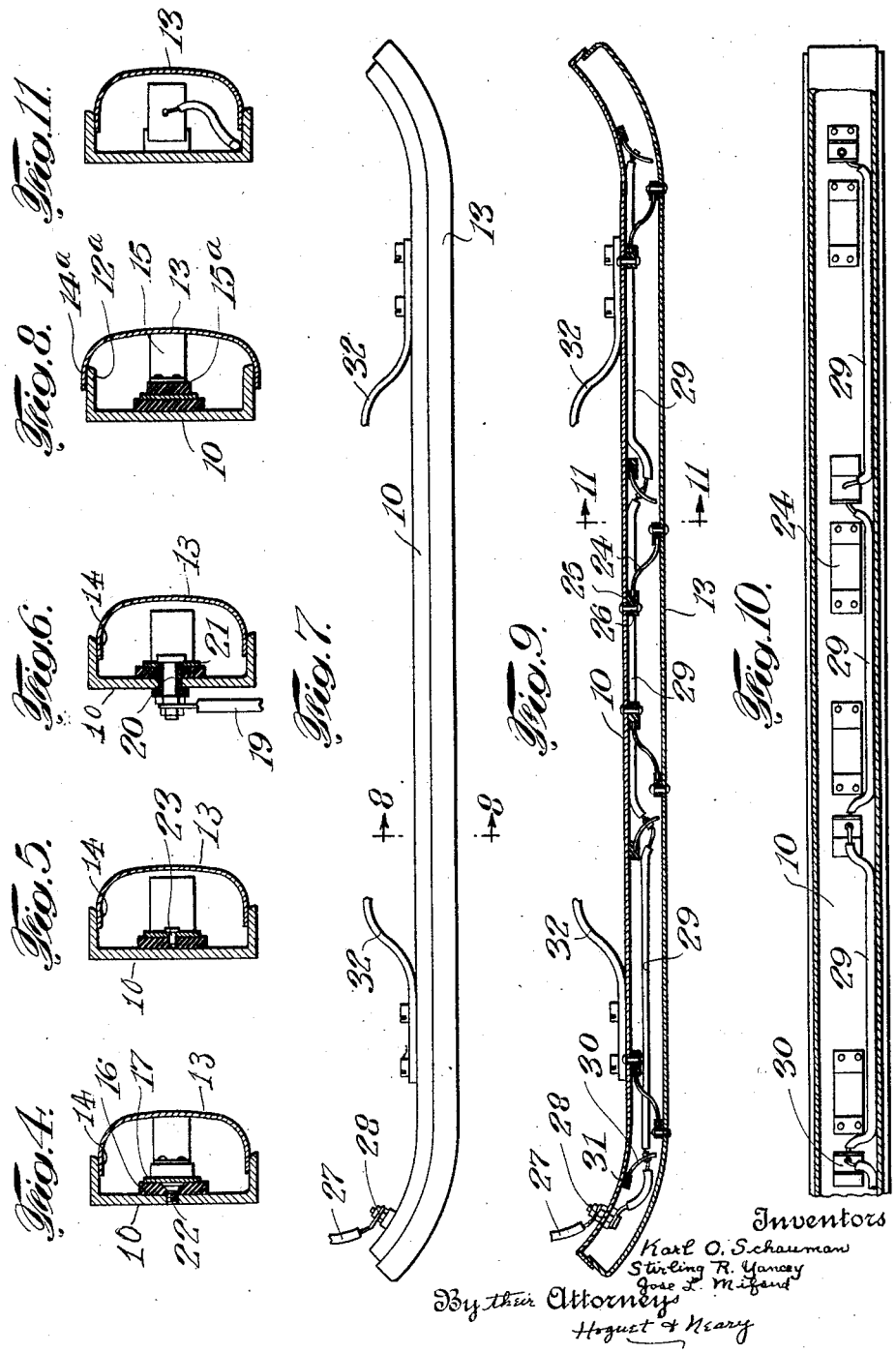

1,658,574

UNITED STATES PATENT OFFICE.

KARL O. SCHAUMAN, STIRLING ROSS YANCEY, AND JOSE L. MIFSUD, OF NEW YORK, N. Y., ASSIGNORS TO SURE-GUARD CORPORATION, OF NEW YORK, N. Y., A CORPORATION OF NEW YORK.

BUMPER.

Application filed September 10, 1927. Serial No. 218,612.

This invention appertains to improvements in bumpers for automobiles and other vehicles.

An object of the invention is to provide a bumper of the above class and having a switch incorporated therein which upon impact of the bumper with any object will close an electric circuit to thereby set into operation various devices, give signals and operate to set the brakes of the vehicle or cut off the ignition.

Another object of the invention is to provide a bumper with relatively movable and preferably telescoping parts normally maintained in spaced relation one with respect to the other but adapted upon impact of the bumper with any object to move toward one another and to thereby close an electrical circuit through switch contacts carried by said parts.

A further characteristic of the invention resides in the simplicity and efficiency of the bumper in operation, and the cheapness and low cost of manufacture thereof.

Other objects and advantages of the invention will become apparent as the description proceeds.

In the drawings:

Figure 1 is a plan view of a bumper constructed in accordance with the invention showing the preferred way of applying the same to the automobile or other vehicle.

Figure 2 is a longitudinal sectional plan view through the bumper.

Figure 3 is a longitudinal sectional elevational view through the bumper.

Figure 4 is a cross sectional view taken on the line 4—4 of Figure 2.

Figure 5 is a similar view taken on the line 5—5 of Figure 2.

Figure 6 is also a cross sectional view taken on the line 6—6 of Figure 2.

Figure 7 is a plan view of a modified form of bumper constructed in accordance with the present invention.

Figure 8 is a cross sectional view taken on the line 8—8 of Figure 7.

Figure 9 is a longitudinal plan view through another modified form of bumper.

Figure 10 is a longitudinal elevational view through this modified form of bumper; and Figure 11 is a cross section on the line 11—11 of Figure 9.

As above stated, the bumper comprises essentially two relatively movable parts preferably telescoping one within the other and normally maintained in spaced relation one with the other but adapted when the bumper impacts with any object to move toward the other and thereby close contacts carried by the movable parts to complete the circuit controlling the signals, setting the brakes or cutting off the ignition.

The bumper comprises an element 10 which is mounted on the vehicle as by means of springs 11 or 32 which serve as shock absorbers and have flanged edges 12. The element 10 is preferably constructed of sheet conductive metal and can be formed easily and made cheaply. The other part 13 of the bumper which is also constructed of sheet conductive metal has flanged edges 14 which telescope or fit within the edges 12 of the part 10. The part 13 is relatively movable with respect to the part 12 and is maintained in spaced relation therewith by means such as springs 15 or 24 which are best shown in Figure 2.

Along the side of the part 10 and within the interior of the bumper we preferably dispose a strip 16 of insulating material and along this strip of insulating material is placed a strip of conducting material 17. The strip of conducting material carries contact members 18 or 30 in the nature of pointed prongs which are adapted to scrape against the portion 13 of the bumper when the same is moved towards the portion 12 due to impact of the bumper with any object. Upon such movement and when the part 13 scrapes against the switch contacts 18 a circuit is completed from the wire 19 through a binding post or bolt 20 which extends through the part 10 and makes contact with the conducting strip 17 but is insulated from the part 10 by the insulating washer or bushing 21 shown in Figure 6. From the metallic strip 17 the circuit is completed through the switch contacts 18, thence through the metallic part 13 and the metallic part 12 to the spring 11 from whence the circuit is grounded. The insulating strip 16 is joined to the part 10 as by means of screws 22 or the like while the metallic conducting strip 17 is affixed to the insulating strip as by means of screws 23 or the like. Insulating members 15ª are affixed to the springs 15 and insulate the conducting strip 16 from the springs and parts 10 and 13.

The above construction while very simple in its nature is very efficient in service and has a very desirable characteristic due to its low cost of manufacture. It is very sturdy and strong in nature and, because of the concealed character of the various switch elements, is capable of sustaining severe conditions of service and is not affected by conditions of the atmosphere and the weather. The provision of pointed switch contact members 18 which are in the nature of leaf springs and which scrape against the part 13 when pushed against them to thereby make a very good contact insuring good conductivity of the current in the circuit is another very desirable and characterizing feature of the invention.

In the modification shown in Figures 7 and 8 substantially the same construction is employed except that the part 10 has flanges 12ª which telescope within the flanges 14ª of the part 13. The only difference in this modification resides in the fact of having the part 13 telescope without the part 10.

In Figures 9 to 11, we have disclosed a modification of a somewhat different character. This modification is designed partly to eliminate the use of an insulating strip on the inner surface of the part 10. In this modification the part 10 is maintained in spaced relation with the part 13 by means of leaf springs 24 which terminate in supporting members 25 fixed to the parts 10 and 13 as by means of rivets 26 or the like.

The current is conveyed through a wire 27 and through a binding post 28 which is insulated from the part 10 and thence through the various wires 29 which are attached to the leaf spring contacts 30. These contacts are mounted in insulating members 31 and are not in direct contact with the parts 10 and 13. Normally the circuit is broken by reason of the fact that the springs 24 maintain the part 13 spaced from the contact members 30 but when the part 13 strikes some object it is moved toward the part 10 and engages the spring contact members 30 which scrape against it and thereby establishes the circuit through the parts 10 and 13 thence through the spring supports 32 to the vehicle, being grounded as in the case of the modification first described.

While we have described specific constructions to illustrate the nature and the character of our invention, we desire to have it understood that various changes and alterations may be made without departing from the spirit of the invention or its scope as expressed in the appended claims.

Having thus described our invention what we claim as new and desire to secure by Letters Patent is:

1. A bumper comprising two relatively movable telescoping members and circuit closing means located between and actuated by the movement of the said members.

2. A bumper comprising two relatively movable members and circuit closing means enclosed within said members and housed thereby.

3. A bumper comprising two relatively movable members and circuit closing means located between said members, said means including a spring contact associated with one of said members and pointed to scrape against the other of said member when pushed thereagainst.

4. A bumper comprising two relatively movable members, said members being constructed of sheet metal and arranged for telescoping engagement, and circuit closing means associated with said members and housed within the same.

5. A bumper comprising two relatively movable conductive members, a contact member supported by one of said conductive members but insulated therefrom and extending into the moving path of the other member, and a conductor connected to said contact member.

6. A bumper comprising two relatively movable conductive members, a contact member supported by one of said conductive members but insulated therefrom, and a conductor connected to said contact member, said contact member comprising a leaf spring pointed to scrape against the other of said conductive members when pushed thereagainst.

7. A bumper comprising two relatively movable conductive members constructed of sheet metal and arranged for telescoping engagement, an insulating member affixed to the interior of one of said members, a conductive strip secured to said insulating member, a conductor connected to said strip, and contact members attached to said strip and arranged for scraping engagement with the other of said conductive members when pushed thereagainst.

In testimony whereof, we have signed our names to this specification this 8th day of September, 1927.

KARL O. SCHAUMAN.
STIRLING ROSS YANCEY.
JOSE L. MIFSUD.